United States Patent [19]

Johnson

[11] 4,301,773

[45] Nov. 24, 1981

[54] HYDRODYNAMIC INDUCED DRAFT AND WATER COOLED FLUE GAS HOT WATER HEATER

[76] Inventor: Arthur W. Johnson, 105 W. Janss Rd., Thousand Oaks, Calif. 91360

[21] Appl. No.: 88,030

[22] Filed: Oct. 25, 1979

[51] Int. Cl.³ ............................................. F22B 1/02
[52] U.S. Cl. ............................. 122/31 A; 126/360 A
[58] Field of Search .................... 122/31, 31 A, 32; 126/360 R, 360 A, 391

[56] References Cited

U.S. PATENT DOCUMENTS

| | | | |
|---|---|---|---|
| 2,787,318 | 4/1957 | Wolfersperger | 126/360 R |
| 2,878,644 | 3/1959 | Fenn | 126/360 A X |
| 3,138,150 | 6/1964 | Hyer et al. | 126/360 A |
| 3,568,658 | 3/1971 | Brock | 126/360 A |
| 4,018,216 | 4/1977 | Thurley | 126/360 R |
| 4,201,191 | 5/1980 | Zink et al. | 126/360 A |

*Primary Examiner*—Edward G. Favors
*Attorney, Agent, or Firm*—Christie, Parker & Hale

[57] ABSTRACT

A hot water heater in which water is heated by passing it through a heat exchanging coil positioned in a tank filled with a heat exchanging liquid, such as water. Flue gases are drawn from a burner by a jet pump positioned in the tank, the gases passing through a second heat exchanging coil. The jet pump is driven by heat exchanging liquid from the tank circulated by an auxiliary pump. The flue gases are mixed with the heat exchanging liquid by the jet pump causing the flue gases to be washed and cooled before they are vented off from the top of the tank.

9 Claims, 4 Drawing Figures

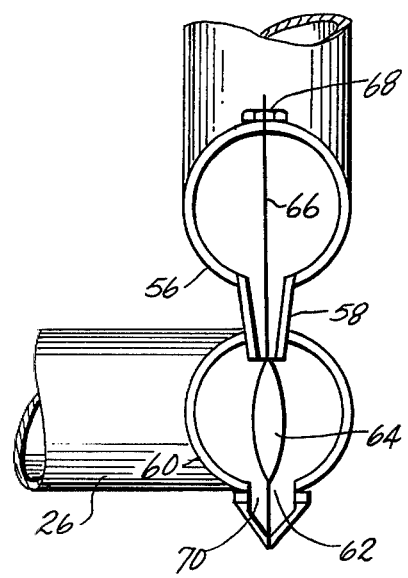
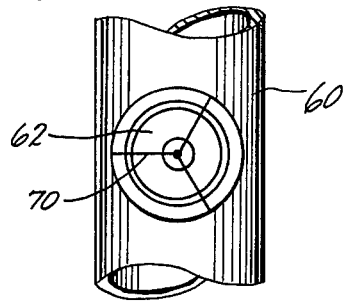

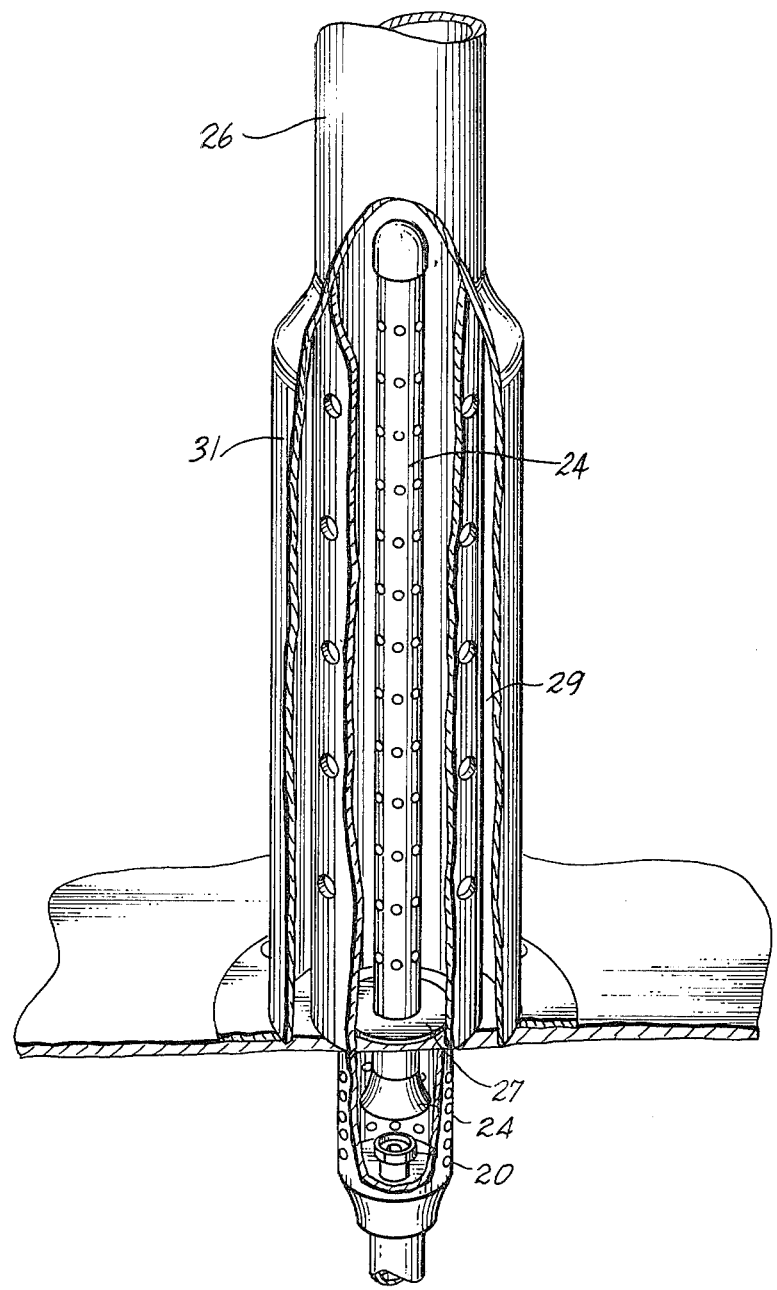

HYDRODYNAMIC INDUCED DRAFT AND WATER COOLED FLUE GAS HOT WATER HEATER

FIELD OF THE INVENTION

This invention relates to hot water heaters, and more specifically, to a heater in which heat is transferred through an intermediate liquid.

BACKGROUND OF THE INVENTION

In conventional hot water heaters, combustion gases from burning gas or other fuel pass through heat exchanging tubes immersed in a tank containing the water being heated or over serpentine tubes containing the water being heated. The hot combustion gases are then vented to the atmosphere. Such hot water heaters are relatively inefficient because only a small percentage of the heat from the hot gases is given up to the water before the gases are vented. The hot vented gases are a potential fire hazard and, when certain types of fuels are burned, are a source of pollution.

SUMMARY OF THE INVENTION

The present invention is directed to an improved hot water heater capable of extracting a greater amount of heat from combustion gases and releasing the gases to atmosphere at a substantially lower temperature. At the same time, the combustion gases are washed to remove any particulate matter. These and other advantages of the present invention are achieved by providing a water heater having a tank adapted to hold a volume of heat exchanging liquid, such as water. A first heat exchanging coil positioned in the tank has an external inlet and outlet connection for conducting the water to be heated through the tank. A flue pipe for receiving flue gases from a burner forms a coil within the tank, the flue pipe terminating in a fluid jet pump which draws the flue gases from the burner. The jet pump releases the flue gases within the tank allowing the flue gases to mix with the heat exchanging liquid for being vented from the top of the tank. An auxiliary pump circulates the heat exchanging liquid through the jet pump to drive the jet pump.

BRIEF DESCRIPTION OF THE DRAWINGS

For a better understanding of the invention reference should be made to the accompanying drawings, wherein:

FIG. 2 is a detailed sectional view of the jet pump; and

FIG. 3 is an end view of a jet pump outlet; and

FIG. 4 is an enlarged view of the burner.

DETAILED DESCRIPTION

Figure 1:
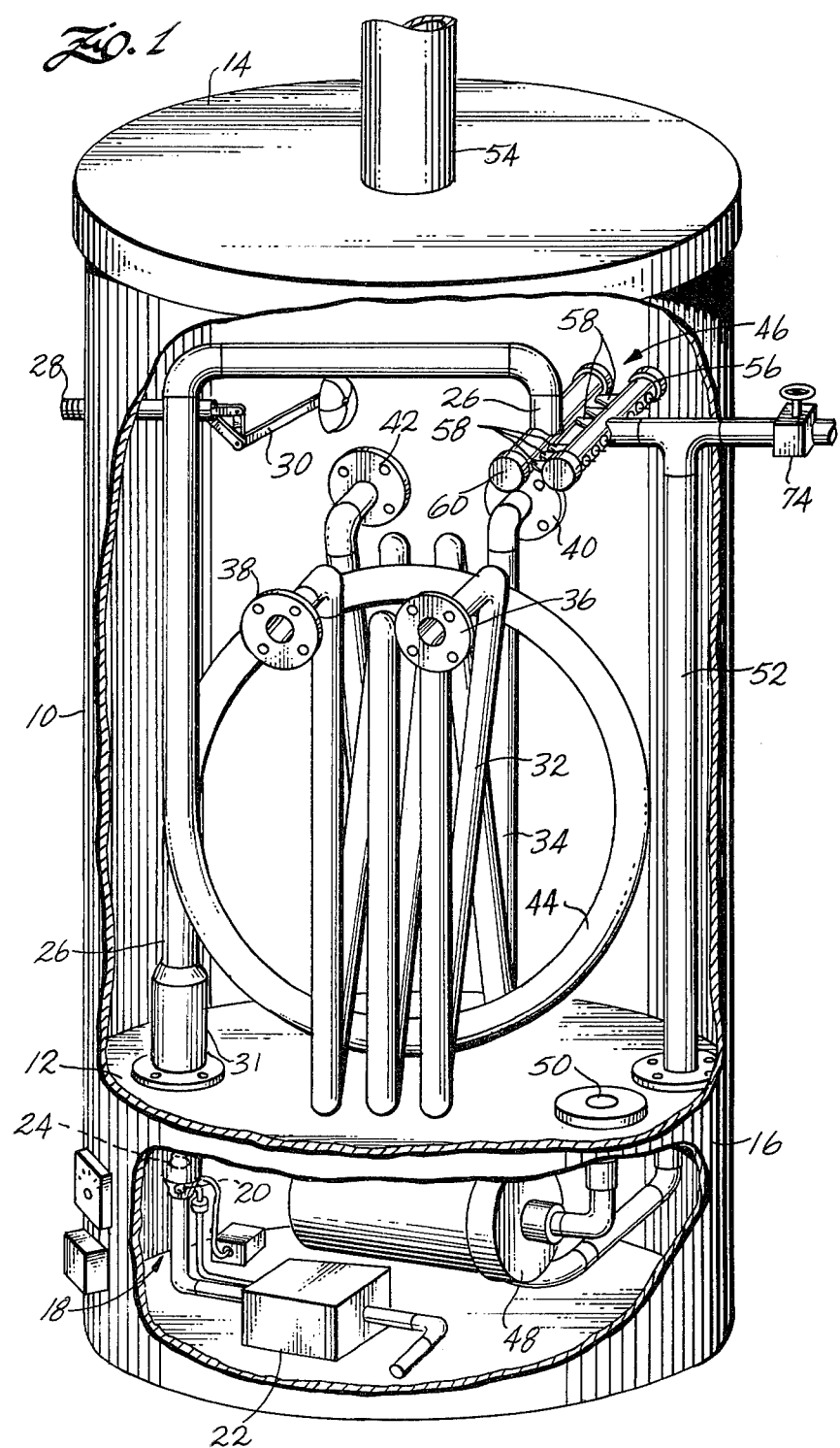
FIG. 1 is a perspective view partially cut away showing the preferred embodiment of the present invention.

Referring to the drawings in detail, the numeral 10 indicates generally a cylindrical tank having a bottom 12 and a sealed cover 14. The tank is supported on a cylindrical base 16 which houses a burner assembly, indicated generally at 18, for burning natural gas or LP gas. The burner is of conventional design and includes an orifice 20 through which the gas is metered by a valve and pressure reducer 22. The gas is mixed with primary air and released through openings in a tubular burner element 24. The combustion gases are drawn into a flue pipe 26. The pipe 26 terminates in an end wall 27 through which the burner 24 extends. The lower end of the pipe 26 where it surrounds the burner is perforated to admit secondary air into the annular combustion chamber 29 between the burner 24 and surrounding pipe 26. An outer jacket 31 extends around the perforated end of the pipe 26 within the tank to seal off the water in the tank while allowing secondary air to be drawn into the combustion chamber 29 projecting up into the tank. Details of the burner are shown in FIG. 4.

The tank 10 is partially filled with a heat exchanging liquid, preferably water, which is received through an inlet pipe 28. The tank is filled to a predetermined level through the inlet pipe by a float control valve, indicated generally at 30, which turns off the flow of water into the tank when the water rises to a predetermined level. One or more heat exchanging tubular coils, two of which are indicated at 32 and 34, are mounted in the tank and immersed in the heat exchanging liquid. The coil 32 has inlet and outlet coupling flanges 36 and 38 extending on the outside of the tank. Similarly the heat exchanging coil 34 terminates in inlet and outlet coupling flanges 40 and 42 secured to the wall of the tank. Water or other fluid to be heated by the hot water heater are circulated through the interior of the heating coils 32 and 34.

Heat is transferred from the flue gases to the water circulating through the heat exchanging coils 32 and 34 by heating the heat exchanging liquid in the tank. This is accomplished by extending the flue gas pipe in a coil 44 within the tank. The perforated burner pipe 24 extends concentrically within the flue pipe 26 through a portion of the length of the coil 44. Thus the burner operates to directly heat the flue pipe coil 44 within the tank 10.

The hot combustion gases are drawn through the flue pipe 26 by a jet pump 46. The jet pump uses high velocity water jets to mix with the flue gas molecules, producing a sub-atmospheric pressure in the flue pipe 26. The heat exchange liquid in the tank 10 is used to drive the jet pump 46. To this end, an auxiliary pump 48 mounted below the tank 10 withdraws the heat exchange liquid from the bottom of the tank through a pump inlet 50. The auxiliary pump delivers the liquid under pressure through an outlet pipe 52 to the jet pump 46 where it is mixed with the flue gases and discharged back into the tank. The undissolved flue gases then bubble to the surface of the tank and are discharged through a vent 54 in the top of the tank. The flue pipe 26 has a portion extending above the level of the heat exchange liquid in the tank to prevent the liquid from running out the flue pipe when the jet pump is not operating.

The jet pump 46, in the preferred embodiment shown in the drawings, includes a first manifold 56 for receiving the water under pressure from the pump 48. A plurality of jet nozzles 58 project from the first manifold 56. The ends of the nozzles 58 extend into a second manifold 60 connected to the end of the flue gas pipe 26. The second manifold 60 has an orifice opposite each of the jet nozzles 58, as indicated at 62, through which the jets of liquid formed by the respective nozzles are discharged back into the tank. The cross-section of the jet stream is expanded by a hydrofoil element 64 positioned in front of each of the nozzles 58 within the second manifold 60. The hydrofoil elements 64 are supported on tension wires 66 which are anchored to the wall of the first manifold at 68 and held concentrically in the orifices 62 by spider members 70 that are held in place in the orifices by the tension applied to the wires 66. The water jet passing over the hydrofoil elements 64 and out the orifices 62 induces a flow of flue gases from the burner through the flue pipe 26, forcing the flue gases into the heat exchange liquid filling the tank 10. Thus the gases are cooled to approximately the temperature of the heat exchange liquid within the tank. The water or other liquid in the tank 10 acts to scrub the flue gases before they are discharged through the vent 54. When particulate matter and other pollutants accumulate in the heat exchange liquid in the tank, the water in the tank can be replaced by opening a valve 74 and using the auxiliary pump 48 to pump the water out of the tank, allowing the float valve 30 to open and fresh water to be added through the inlet pipe 28.

What is claimed is:

1. A gas-fired water heater comprising a tank adapted to hold a volume of liquid, a heat exchanging coil positioned in the tank having external inlet and outlet connections for conducting a fluid through the tank, a burner, a flue pipe for receiving the flue gases from the burner, the flue pipe extending into the tank, a fluid jet pump in the tank connected to the flue pipe for pumping the flue gases from the burner, the jet pump having an outlet for releasing the flue gases within the tank, and auxiliary pump means having an intake connected to the tank and an outlet connected to the jet pump for circulating the liquid in the tank through the jet pump to pump the flue gases and mix the flue gases with the liquid in the tank, and means for venting the flue gases from the top of the tank.

2. Apparatus of claim 1 wherein the flue pipe includes at least one coil in the tank between the burner and the jet pump.

3. Apparatus of claim 2 further including means for maintaining liquid in the tank at a predetermined level above the heat exchanging coil and the flue pipe coil.

4. Apparatus of claim 3 wherein the jet pump outlet is below said predetermined level.

5. Apparatus of claim 4 wherein a portion of the flue pipe intermediate the burner and the jet pump extends above said predetermined level.

6. Apparatus of claim 1 wherein the gas burner extends inside the flue pipe within the tank.

7. Apparatus for heating fluids comprising: means for burning fuel to generate hot combustion gases, a heat exchanging tank storing a heat exchanging fluid, first and second heat exchanging coils in said tank, means directing said combustion gases through the first coil, means directing the fluid to be heated through the second coil, a jet pump connected to the first coil for producing a partial vacuum in the first coil, means discharging a high velocity fluid through the jet pump to drive the pump, the high velocity fluid being mixed with the combustion gases by the jet pump, the jet pump discharging the mixed fluid and gases into the heat exchange fluid within the tank, and means for venting the gases from the top of the tank.

8. Apparatus of claim 7 wherein the means driving the jet pump includes an auxiliary pump connected to the tank for withdrawing heat exchanging fluid from the tank, the output fluid from the pressure pump being connected to the jet pump for driving the jet pump and mixing with the hot gases.

9. A gas-fired water heater comprising a tank adapted to hold a volume of liquid, a heat exchanging coil positioned in the tank having external inlet and outlet connections for conducting a fluid through the tank, a burner, a flue pipe for receiving the flue gases from the burner, the flue pipe extending into the tank, a fluid jet pump connected to the flue pipe for pumping the flue gases from the burner, the jet pump having an outlet for releasing the flue gases within the tank, means for circulating the liquid in the tank through the jet pump to pump the flue gases and mix the flue gases with the liquid in the tank, and means for venting the flue gases from the top of the tank.

* * * * *